H. W. BOWMAN.
RESILIENT MOUNTING FOR WHEELS.
APPLICATION FILED SEPT. 9, 1912.
1,065,207.
Patented June 17, 1913.
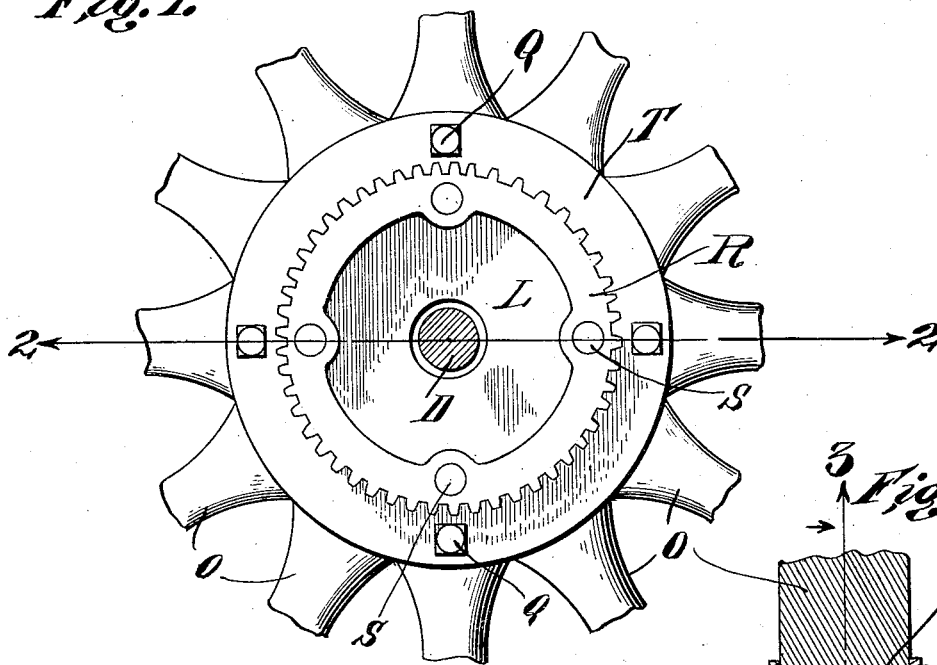
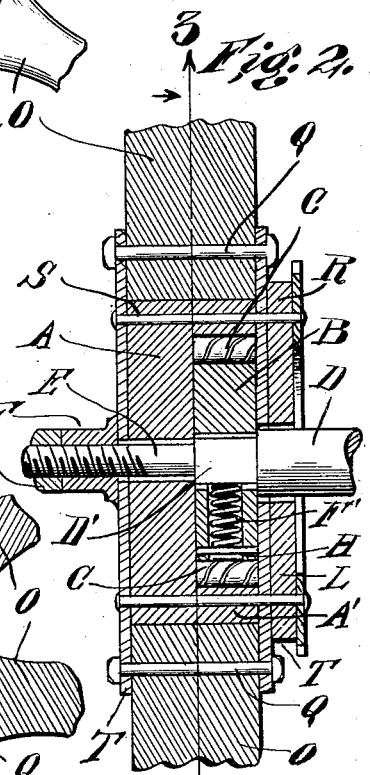
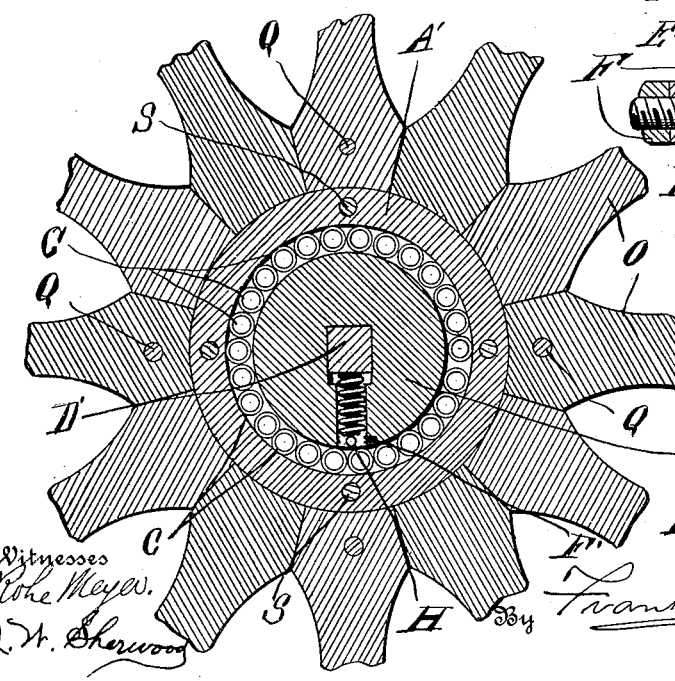
Witnesses
Inventor
H. W. Bowman.
Attorney

UNITED STATES PATENT OFFICE.

HENRY W. BOWMAN, OF BARBOURVILLE, KENTUCKY.

RESILIENT MOUNTING FOR WHEELS.

1,065,207.  Specification of Letters Patent.  Patented June 17, 1913.

Application filed September 9, 1912. Serial No. 719,422.

*To all whom it may concern:*

Be it known that I, HENRY W. BOWMAN, a citizen of the United States, residing at Barbourville, in the county of Knox and State of Kentucky, have invented certain new and useful Improvements in Resilient Mountings for Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in mountings for resilient wheels and especially in the provision of a resilient hub portion, thus affording means whereby the vibration may be taken up and dispensing with the use of pneumatic tires.

The invention consists further in various details of construction and combinations and arrangements of parts which will be hereinafter fully described, shown in the accompanying drawings and then specifically defined in the appended claim.

My invention is illustrated in the accompanying drawings, in which:—

Figure 1 is an elevation of a portion of the wheel and hub. Fig. 2 is a sectional view on line 2—2 of Fig. 1, and Fig. 3 is a sectional view on line 3—3 of Fig. 2.

Reference now being had to the details of the drawings by letter, A designates a hub portion which is provided with an annular flange A', which latter forms the wall of a circular outlined recess in which a circular outlined plate B is mounted. A series of anti-friction rollers C is mounted around the inner marginal edge of said flange and form bearings for the plate B. An axle, designated by letter D, has a squared portion D' which passes through a similar shaped opening in said plate and has a contracted cylindrical portion E which passes through a cylindrical outlined aperture formed in the hub portion A. Nuts F are fitted to the threaded portion of said contracted part of the axle and serve to hold the axle in place.

Upon reference to Fig. 3 of the drawings, it will be noted that the opening in the circular outlined plate is somewhat elongated or rectangular shaped and a coiled spring F' is mounted in a radial slot or opening H which leads from one end of said opening in the plate through the circumference thereof. Said spring is fastened at its outer end to the plate and its other end bears yieldingly against the axle and is adapted to receive the weight thereof. By this construction, it will be noted that the spring will yield under the weight of the axle and load coming thereon, thereby taking up vibrations incident to the wheel traveling over rough ground or obstructions.

Spokes O are fastened to the hub portion by any suitable means and a sprocket wheel R is held by means of rods S to the hub and also to the plates T which clamp the opposite edges of the spokes and which plates T are held by means of the rods Q. In order that the sprocket wheel may be positioned a slight distance from the adjacent plate T, an apertured disk L is interposed between the sprocket plate and the hub, thereby allowing sufficient room for a sprocket chain to turn upon said sprocket wheel.

By the provision of a wheel made in accordance with my invention, it will be noted that the axle rests upon the coiled spring and passes through a hole in the central plate, the plate being surrounded by ball bearings and to which the sprocket wheel is attached, the friction therefore being reduced to a minimum.

What I claim to be new is:—

A spring mounting for a wheel comprising a circular-outlined, centrally apertured hub portion with a recess in one face thereof, a circular-outlined plate mounted centrally within said recess and having a radial slot formed therein communicating with a central opening, a spring seated in said slot and extending into the central opening of the circular plate, an axle having an angular outlined portion extending through said opening in the plate and resting upon said spring and provided with a cylindrical contracted end extending through the hub portion, apertured plates fastened to the opposite faces of the hub portion, one of said plates confining the circular-outlined plate, roller bearings interposed between the latter and the circumferential wall of the recess in which the plate is mounted, an apertured disk fastened to one of said plates, and a sprocket wheel fastened to the outer face of the disk and of larger diameter than said disk and through which disk and sprocket wheel the axle is adapted to pass, as set forth.

In testimony whereof I hereunto affix my signature in the presence of two witnesses.

HENRY W. BOWMAN.

Witnesses:
J. M. ROBSION,
W. R. BARNER.

Copies of this patent may be obtained for five cents each, by addressing the "Commissioner of Patents, Washington, D. C."